(12) United States Patent
Eriksson

(10) Patent No.: US 7,886,770 B2
(45) Date of Patent: Feb. 15, 2011

(54) MSM COMPONENT AND ASSOCIATED GAS PANEL ASSEMBLY

(76) Inventor: Mark L. Eriksson, 2004 13th St., South, St. Cloud, MN (US) 56301

( * ) Notice: Subject to any disclaimer, the term of this patent is extended or adjusted under 35 U.S.C. 154(b) by 0 days.

(21) Appl. No.: 12/843,298

(22) Filed: Jul. 26, 2010

(65) Prior Publication Data

US 2010/0319797 A1 Dec. 23, 2010

Related U.S. Application Data

(63) Continuation of application No. 11/827,621, filed on Jul. 12, 2007, now Pat. No. 7,784,497.

(51) Int. Cl.
*F16K 11/10* (2006.01)
(52) U.S. Cl. ....................................... 137/884
(58) Field of Classification Search ................. 137/269, 137/270, 271, 597, 884
See application file for complete search history.

(56) References Cited

U.S. PATENT DOCUMENTS

| | | | |
|---|---|---|---|
| 5,819,782 A | 10/1998 | Itafuji | |
| 5,836,355 A | 11/1998 | Markulec et al. | |
| 6,216,739 B1 | 4/2001 | Fukushima et al. | |
| 6,293,310 B1 | 9/2001 | Redemann et al. | |
| 6,298,881 B1 | 10/2001 | Curran et al. | |
| 6,640,835 B1 | 11/2003 | Rohrberg et al. | |
| 6,644,353 B1 | 11/2003 | Eidsmore | |
| 6,874,538 B2 | 4/2005 | Bennett | |
| 6,951,226 B2 | 10/2005 | Eriksson et al. | |
| 6,953,048 B2 | 10/2005 | Chuh | |
| 7,048,008 B2 | 5/2006 | Milburn | |
| 7,320,339 B2 | 1/2008 | Milburn | |
| 7,334,605 B2 | 2/2008 | Vu | |
| 7,458,397 B2 | 12/2008 | Doyle | |
| 7,562,677 B2 | 7/2009 | Perusek et al. | |

FOREIGN PATENT DOCUMENTS

WO 2005/008107 1/2005

OTHER PUBLICATIONS

International Search Report and Written Opinion for PCT/US2008/008471 mailed Nov. 12, 2008, completed on Nov. 20, 2008.

*Primary Examiner*—John Fox
(74) *Attorney, Agent, or Firm*—McDonnell Boehnen Hulbert & Berghoff LLP

(57) ABSTRACT

A gas panel assembly having at least one U-shaped MSM interconnection component is disclosed where the interconnection component straddles at least a pair of adjacent modular inserts and is fastened to planar support plate such that the fluidic inserts are held immobile.

4 Claims, 2 Drawing Sheets

MSM COMPONENT AND ASSOCIATED GAS PANEL ASSEMBLY

CROSS REFERENCE TO RELATED APPLICATIONS

This application is a continuation of U.S. patent application Ser. No. 11/827,621 filed on Jul. 12, 2007, the entire contents of which are incorporated herein by reference

FIELD OF THE INVENTION

My invention relates in general to gas handling systems for semiconductor processing and in particular, to gas panel systems whether of a localized nature or distributed around a semiconductor processing tool. In particular, the present invention relates to the field of fluid handling devices, and specifically to a system and assembly for allowing process fluid flow into and out of modular surface mounted ("MSM") fluidic components used in the semiconductor industry.

BACKGROUND

Wafer fabrication facilities are commonly organized to include areas in which chemical vapor deposition, plasma deposition, plasma etching, sputtering and the like are carried out. In order to carry out many of these processes, it is necessary that the tools which are used for the process, be they chemical vapor deposition reactors, vacuum sputtering machines, plasma etchers or plasma enhanced chemical vapor deposition, be supplied with various process gases which gases may be reactive or inert or provide reactive species. It may be appreciated that in each instance pure carrier gases or reactant gases must be supplied to the tool in contaminant-free, precisely metered quantities.

In a typical wafer fabrication facility the inert and reactant gases are stored in tanks which may be located in the basement of the facility and which are connected via piping or conduit to a valve manifold box. The tanks and the valve manifold box are considered to be part of the facility level system. At the tool level an overall tool system, such as a plasma etcher or the like, includes a gas panel and the tool itself. The gas panel contained in the tool includes a plurality of gas paths having connected therein manual valves, pneumatic valves, pressure regulators, pressure transducers, mass flow controllers, filters, purifiers and the like. All have the purpose of delivering precisely metered amounts of pure inert or reactant gas from the valve manifold box to the tool itself.

The gas panel is located in the cabinet with the tool and typically occupies a relatively large amount of space, as each of the active devices are plumbed into the gas panel, either through welding tubing to the devices or combinations of welds and connectors such as VCR connectors. Gas panels are relatively difficult to manufacture and hence expensive. In a combination VCR connector and welded tubing system the individual components are held on shimmed supports to provide alignment prior to connections at VCR fittings. Misalignment at a VCR fitting can result in leakage.

Additional problems with conventional gas panels relate to the fact that a combination VCR and welded system of the type currently used today typically requires a significant amount of space between each of the components so that during servicing the VCR connections can be accessed and opened. In addition, in order to remove an active component from a contemporary gas panel, many of the supports of the surrounding components must be loosened so that the components can be spread out to allow removal of the active component under consideration.

The advent of modular surface mount ("MSM") fluidic components, beginning in the mid-nineteen nineties, is perceived as a significant milestone in reducing the size of fluidic systems. That is, systems comprised of fluid control and measurement components such as valves, regulators, filters, pressure transducers, mass flow meters, and mass flow controllers. Prior to MSM interfaces, such components were typically joined for fluid communication by interconnecting tubulations either via welding or via reusable gasketed connections. Either method was enabled by metal tubing protrusions, or appendages, intrinsic to each fluidic component for the express purposes of interconnection and fluid transport.

MSM interfaces did reduce the size, or "footprint," of fluidic systems considerably. In MSM architecture, the fluidic component is sealed, typically with elastomer O-rings or metal gaskets, using bolts for compression, to a receptive MSM or "modular" architecture. Several MSM or modular architectures that are in common use are described in U.S. Pat. No. 5,836,355; U.S. Pat. No. 6,874,538; U.S. Pat. No. 6,951,226; U.S. Pat. No. 6,293,310 and U.S. Pat. No. 7,048,008. A common aspect of these disclosures is twofold: (1) to provide for the standardized fluidic interface to seal to the MSM component and (2) to provide interconnecting gas conduits for the purpose of routing fluids into, out of, and between fluidic components.

The reduction of size and internal "wetted" area and volume afforded by modular fluidic systems are well understood, especially within the semiconductor wafer processing industry wherein size, purity of fluids, cleanliness of the gas system, and serviceability are prized attributes of any fluidic system.

Although MSM-type fluidic systems offer advantages in terms of reduced size, reduced area and volume exposed to the controlled fluids, and improved serviceability, the MSM component typically must be sealed to a receptive modular architecture in the manner disclosed by the aforementioned patents. Put in another way, the MSM fluid component is typically mated to a corresponding modular interface in order to complete the fluidic circuit. Conventionally, this corresponding modular interface is provided by modular architectures of various designs but all of which embody the standard modular interface as set forth by SEMI Standards F86-0304 and F87-0304, among others.

While there exist a number of ways to assemble gas panel systems, I have devised a new approach that minimizes space requirements, substantially eliminates the number of parts needed and allows easy servicing of MSM components. My invention addresses the various difficulties associated with the use of prior art gas panel assemblies by using MSM components having U-shaped interconnections that interface and secure one or more modular fluid inserts to a base or support plate. The U-shaped design has alignment legs that straddle the modular fluid inserts in a pressing engagement against a planar support plate when the interconnection is fastened directly to a planar support surface. The fluid inserts have at least one alignment connector on its bottom side that removably engages alignment slots cut into the planar surface. These and other features of my invention are described below.

SUMMARY

My invention is directed to gas panel assemblies and in particular to a novel MSM interconnection component. The assemblies are characterized by three main components; 1) a planar support plate, 2) at least a pair of modular fluid inserts, and 3) at least one U-shaped MSM interconnection component that straddles and is in fluid communication with the pair of fluid inserts.

As the name suggests, this interconnection component is characterized by its U-shaped design that allows it to straddle the modular fluid inserts that have been positioned on a planar support surface through a cooperative interaction of alignment pins and slots, with the slot preferably located on the planar support plate. The interconnection component has a base portion having a top surface, a bottom surface and at least two alignment legs. The alignment legs and bottom surface define the U-shape opening that allows the component to straddle the fluid inserts. The top surface of the interconnection component can support a variety of MSM components that perform different process functions with respect the process fluid. Regardless of the particular MSM component used, the U-shaped interconnection component allows for fluid communication with the fluid inserts through the bottom surface via ports drilled in the base. The bottom surface is capable of forming a hermetic seal with the top surface of one or more fluid inserts. In a typical configuration, one port in one fluid insert is in sealing relationship with one port on the bottom surface of the interconnection component and one port on a second adjacent fluid insert is in a sealing relationship with a second port on the bottom surface of the interconnection component. In this fashion fluid can travel from one fluid insert to an adjacent fluid insert via the interconnection component of the MSM component. In other words, the process fluid flows from one modular fluid insert through one fluid passage way in the base portion of the MSM interconnection component and back through a second fluid passage way of the interconnection component and into a second fluid insert.

The interconnection component has at least two fastener passages located in the at least two alignment legs. These fastener passages are aligned with similar passages in the planar support surface. In this manner fasteners are used to secure the MSM component directly to the planar support surface. The length of the alignment legs are chosen such that the bottom surface of the interconnection component exerts a downward pressing force on the top surface of the fluid insert (or on a gasket or seal that is sandwiched there between). This downward force not only creates a leak proof seal between the fluid insert and the interconnection component, but it also prevents the fluid insert from moving in any direction. The inserts are also held in a non-movable relationship with the planar support plate by a combination of the pressing force and the interaction of the alignment pins with the slots.

More particularly, the invention relates to a gas panel assembly comprising a planar support plate having one or more alignment slots and a plurality of fastener passages; at least a pair of modular fluid insert having top and bottom faces, with at least one alignment pin protruding from the bottom faces that is configured to engage the alignment slot in the support plate, and where the insert has one or more fluid passages in the top face. At least one U-shaped MSM interconnection component having a base with top and bottom faces, where the top face is configured with an MSM component, the bottom face having one or more fluid passages, and at least two alignment legs having at least two fastener passages, where the one or more fluid passages in the bottom face is in fluid communication through the base with the MSM component. The MSM interconnection component is configured to provide a sealed interface between the one or more fluid passages in bottom face of the MSM interconnection component and the one or more fluid passages in the top face of the fluid insert; and where the fluid insert is non-movably secured to the support plate when the U-shaped MSM interconnection component is fastened to the support plate using fasteners in the fastener passages.

One skilled in the use of MSM fluidic components will appreciate that the use a U-shaped MSM interconnection to fasten modular fluid inserts to a planar support, without the use of additional parts or fasteners, represents a significant and novel approach for the direct implementation of MSM fluidic components. The use of the U-shaped interconnection components eliminates the need for separate carriage components, which are separately fastened to a support and used to support the modular inserts, is more cost effective to implement, allows for easy replacement of the fluidic inserts for repairs or fluidic path reconfiguration, and allows for mounting of the MSM fluidic components directly to the surface of the planar support for the most compact fluidic assembly possible. These and other embodiments are evident from the following more detailed description of my invention.

DETAILED DESCRIPTION

My invention is useful with all process fluids known to those skilled in the art, including gases and liquids typically used in the fabrication of electronic parts, including semiconductor wafers. The U-shaped interconnector and modular fluid inserts of my invention are preferably manufactured using metals that can transport corrosive process fluids. Such metals include those normally used for ultra-high purity chemical and gas delivery, and for ultra-high vacuum environments, including stainless steel of various alloys, Monel®, nickel, cobalt, titanium, Hastelloy®, and combinations thereof.

Figure 1:
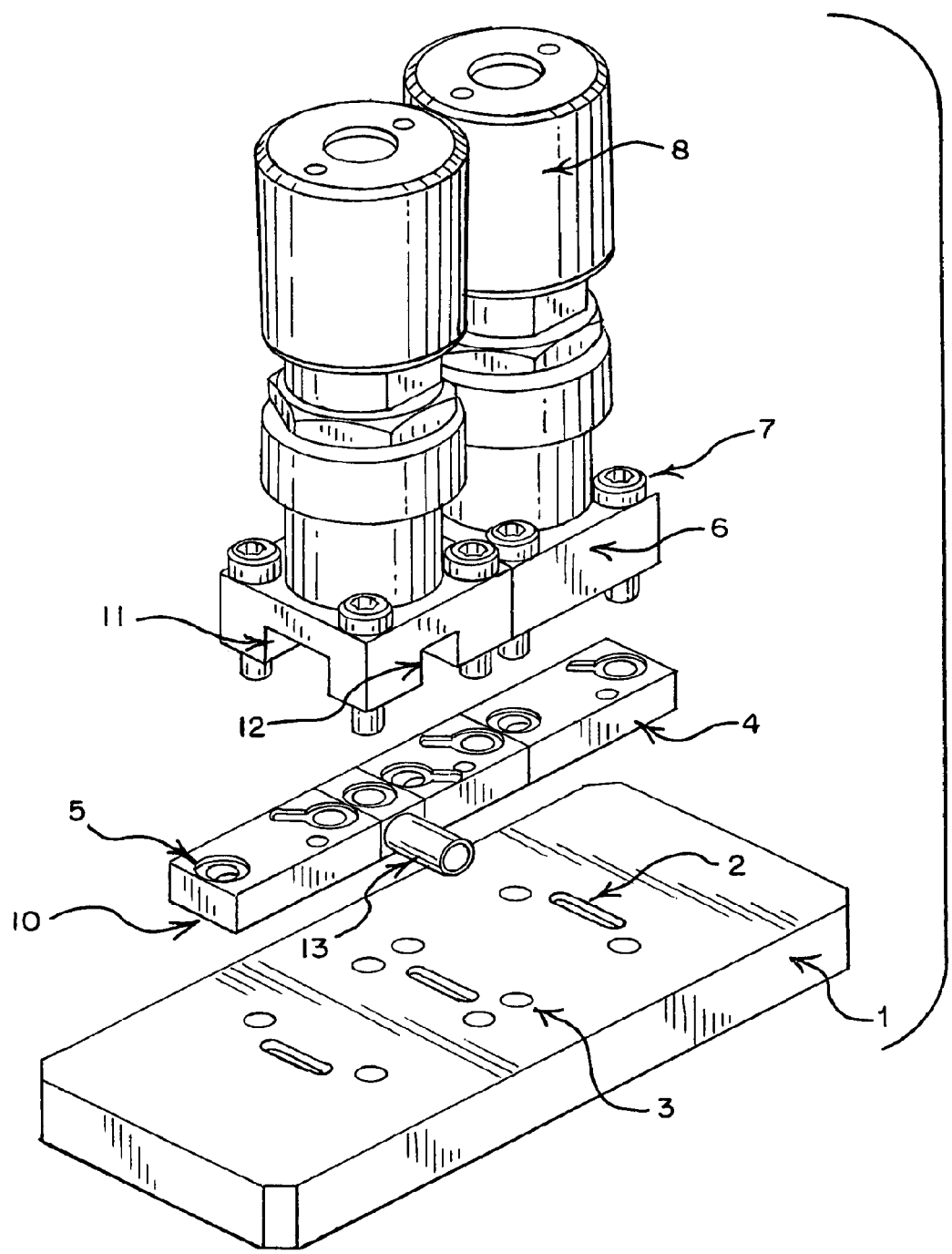
FIG. 1 is a perspective exploded view of an example embodiment of the gas panel assembly of the present invention.
Figure 2:
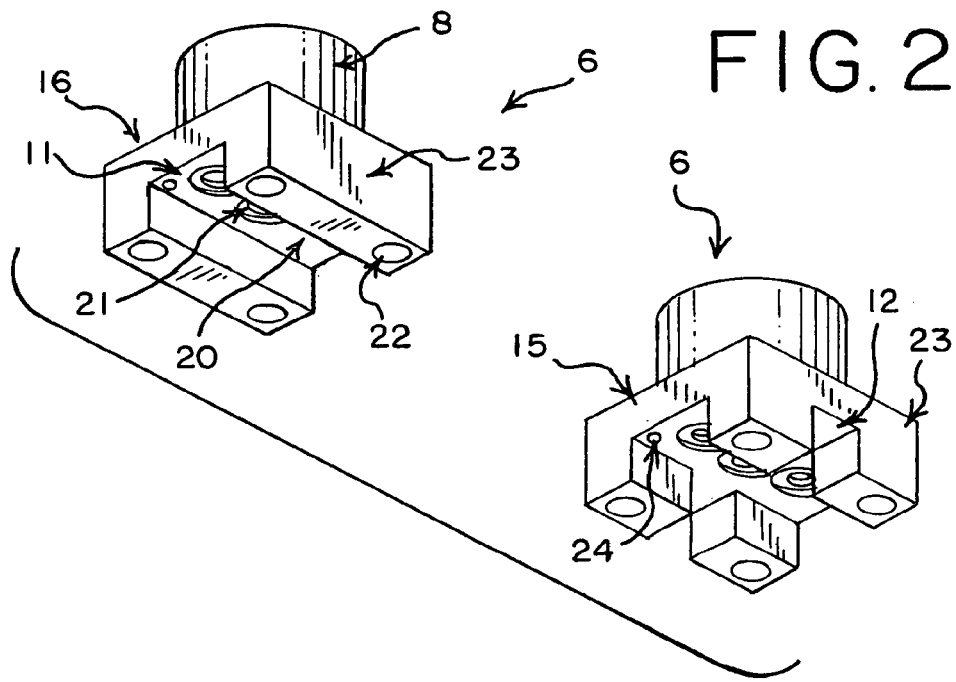
FIG. 2 shows perspective views of two examples of possible interconnection components of the present invention.

In particular, my invention relates to a substantially square or rectangular shaped U-shaped interconnector to provide direct connection to the surface of a planar support plate. Those skilled in the art of metal fabrication may appreciate that both the U-shaped interconnection component and the modular fluid inserts may be fabricated by traditional machining methods from bulk material, or by powder metallurgy (PM) techniques of various forms such as metal injection molding (MIM), hot powder forging, and hot or cold isostatic pressing, or by injection molding. Subsequent "clean-up" machining operations may be required to achieve acceptable surface finishes depending upon the fabrication method used. FIG. 1 shows an exploded view of one example of the gas assembly of our invention where planar support plate 1 contains slots 2 for engaging pins 10 (not visible) located on the bottom surface the modular insert 4. Each insert has fluid passages 5 located in the top face that align and seal with fluid passages (not shown) on the bottom face of U-shaped MSM interconnection components 6. FIG. 2 illustrates two possible designs for the interconnection component 6 having a base 15 and top face 16 and bottom face 20. The MSM component 8 is attached to or integral with top face 16. Bottom face 20 has fluid passages 21 that align with fluid passages 5 in fluid inserts 4. Base 15 also has at least two alignment legs 23 that extend downward to form the U-shaped configuration that allows the interconnection component 6 to straddle fluid inserts 4. Fastener passage ways 22 are positioned in the alignment legs to accept fasteners 7 that releasably engage fastener passages 3 on plate 1 such that the interconnection component straddles inserts 4 and presses them to the surface of plate 1, thus preventing vertical and horizontal movement.

Figure 3:
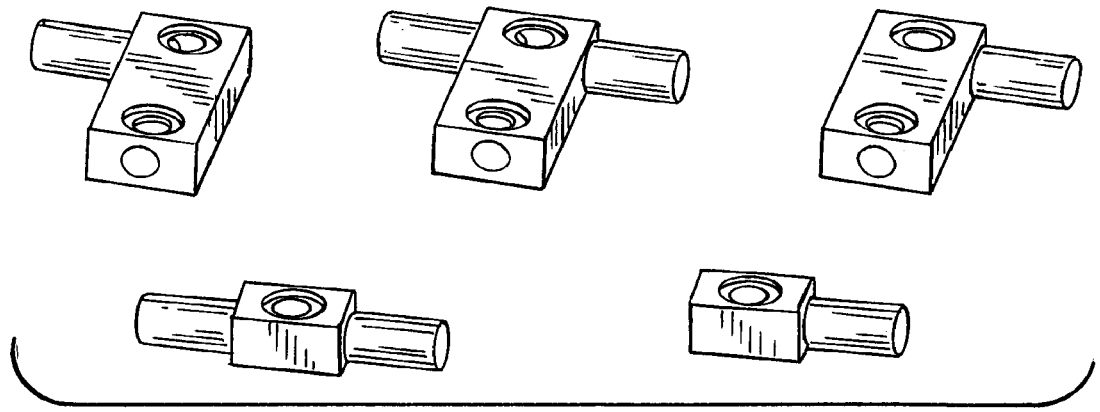
FIG. 3 is a perspective view of examples of fluidic inserts modified to include lateral, or branching, tubulations.
Figure 4:
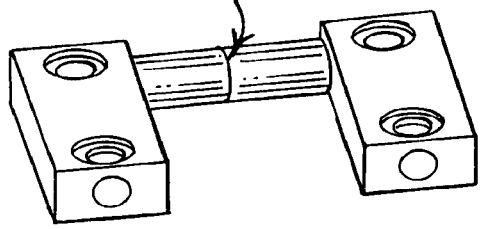
FIG. 4 is a perspective view of one embodiment showing two or more tubulated fluidic inserts joined by welding to form a hermetic path for fluid communication between inserts.

It may be further appreciated that, in practice, the present invention is not limited to single linear assemblies. Modification of appropriate fluidic inserts to include lateral tubulations allows for an additional dimension of construction within a monolithic structure. FIG. 3 shows a representative family of fluidic inserts that include lateral tubulations. These tubulations are in fluid communication with the internal fluid passages of the inserts. Two or more tubulated inserts may be hermetically joined by welding, typically automated orbital welding as is customary in the fabrication of fluid control systems, as may be seen in FIG. 4. The addition of lateral tubulations to the fluidic inserts does not affect their depth. Thus the U-shaped design of the interconnection components accommodates both the linear and transverse, or branching, configurations of the fluidic inserts, which are of a constant depth and simply configured as appropriate. The arrangement of inserts, of course, is driven by the desired fluidic circuit and the corresponding selection and arrangement of components, such as valves, regulators, transducers, and filters, to accomplish that circuit. Thus very efficient spatial use of the monolithic structure surface and complex fluidic circuits may be affected with the employment of the U-shaped interconnection components when mounted to planar support plates as described herein.

Effecting fluid communication through the MSM interconnection components is accomplished by the modular fluid inserts 4. Importantly, the modular inserts of my invention are of a width and height that does not exceed the dimensions of U-shaped space 11. Likewise, in configurations that have manifolds that transverse the centerline of the fluid components, such as manifold 13 shown in FIG. 1, the U-shaped space 12 should be selected to easily straddle such manifolds. Modular inserts 4 are in fluid communication with MSM fluidic component 8 through a sealed relationship due to the compressive force caused by the fasteners 7 securing the interconnection components 6 to the top face of plate 1 using appropriate gaskets and hermetic seals (not shown) that are well known in the art of gas panel assemblies. In order to detect whether a proper seal between the modular inserts and the interconnection component has been achieved, an optional leak check orifice 24 may be included on the interconnection component. This orifice can be a small hole of passage way that is drilled through the base connecting the bottom face to the top face. If the seal is improper, process fluid will escape from the bottom face to the top face and can be easily detected during operation of the assembled gas panel. To ensure a proper seal, it is preferred that the diameters of all fluid passages in the fluid inserts are matched to those in the bottom face of the MSM interconnection components to facilitate obtaining a leak proof seal, especially by the use of individual port seals or a seal plate well known to the art. Because no carriages or other structures are used to support the fluid inserts a compact assembly is possible. Likewise, because the U-shaped interconnection component is secured directly to the support plate this eliminates the need for separate or additional fasteners to secure carriages or other support components. The MSM fluidic components 8, for example, may be valves, regulators, pressure transducers, filters, and any other fluidic components available with MSM-standard interfaces.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

The invention claimed is:

1. A gas panel assembly comprising:
    a planar support plate having one or more alignment slots arranged in two or more rows, with each row having a plurality of fastener passages;
    at least two parallel rows of two or more modular fluid inserts, where each insert has top and bottom faces and at least one alignment protrusion in the bottom faces that is configured to engage the rows of alignment slots in the support plate, where the inserts have one or more fluid passages in the top faces;
    at least at least one tubulated insert positioned in a row and connected to another insert in a different row defining a lateral passage between rows; and
    at least two U-shaped MSM interconnection components each having a base with a top face containing an MSM component, a bottom face having one or more fluid passages, and at least two alignment legs, each having a fastener passage, where the one or more fluid passages in the bottom face is in fluid communication through the base with the MSM component and where the bottom face of the MSM interconnection component is configured to provide a sealed interface with the one or more fluid passages in the top faces of the fluid inserts; and
    where the fluid inserts in each row are non-movably secured to the support plate through a compressive force when the U-shaped MSM interconnection components are fastened to the support plate using fasteners in the fastener passages.

2. The assembly of claim 1 where the lateral passage extends from one row of inserts to an adjacent row at a 90 degree angle.

3. The assembly of claim 1 where the inserts are fabricated from metals selected from the group consisting of stainless steel of various alloys, Monel®, nickel, cobalt, titanium, Hastelloy®, and mixtures thereof.

4. The assembly of claim 1 where the tubulated insert comprises two tubulated inserts, one in each row that are welded together to form a hermetic seal.

* * * * *